US009250443B2

(12) United States Patent
Park et al.

(10) Patent No.: US 9,250,443 B2
(45) Date of Patent: Feb. 2, 2016

(54) HEAD MOUNTED DISPLAY APPARATUS AND CONTENTS DISPLAY METHOD

(75) Inventors: Ji Hyung Park, Seoul (KR); Dong Wook Yoon, Busan (KR); Yong Hun Choi, Seoul (KR); Joong Ho Lee, Yongin-si (KR)

(73) Assignee: Korea Institute of Science and Technology, Seoul (KR)

( * ) Notice: Subject to any disclaimer, the term of this patent is extended or adjusted under 35 U.S.C. 154(b) by 187 days.

(21) Appl. No.: 14/131,762

(22) PCT Filed: Jul. 6, 2012

(86) PCT No.: PCT/KR2012/005385
§ 371 (c)(1),
(2), (4) Date: Apr. 1, 2014

(87) PCT Pub. No.: WO2013/009047
PCT Pub. Date: Jan. 17, 2013

(65) Prior Publication Data
US 2014/0232637 A1    Aug. 21, 2014

(30) Foreign Application Priority Data
Jul. 11, 2011    (KR) ........................ 10-2011-0068291

(51) Int. Cl.
*G06F 3/01*   (2006.01)
*G02B 27/01*  (2006.01)
*G06T 19/00*  (2011.01)

(52) U.S. Cl.
CPC .............. *G02B 27/017* (2013.01); *G06F 3/012* (2013.01); *G06F 3/017* (2013.01); *G06T 19/006* (2013.01); *G02B 2027/014* (2013.01); *G02B 2027/0178* (2013.01); *G02B 2027/0187* (2013.01)

(58) Field of Classification Search
CPC combination set(s) only.
See application file for complete search history.

(56) References Cited

U.S. PATENT DOCUMENTS

| 2009/0237367 | A1  | 9/2009  | Ryu et al.        |
|--------------|-----|---------|-------------------|
| 2010/0175018 | A1  | 7/2010  | Petschnigg et al. |
| 2012/0319951 | A1* | 12/2012 | Lee ........... G06F 1/169 345/161 |
| 2014/0232637 | A1* | 8/2014  | Park .......... G02B 27/017 345/156 |
| 2014/0232648 | A1* | 8/2014  | Park .......... G06F 3/0483 345/156 |

FOREIGN PATENT DOCUMENTS

| JP | 2003-091353 A    | 3/2003  |
|----|------------------|---------|
| KR | 10-2006-0026273 A| 3/2006  |
| KR | 10-0777215 B1    | 11/2007 |
| KR | 10-2010-0047793 A| 5/2010  |

OTHER PUBLICATIONS

International Search Report and Written Opinion of the International Searching Authority mailed Dec. 18, 2012 in counterpart International Application No. PCT/KR2012/005385 (7 pages, in English).

* cited by examiner

*Primary Examiner* — Van Chow
(74) *Attorney, Agent, or Firm* — NSIP Law

(57) ABSTRACT

Disclosed are a head-mounted display apparatus and a contents display method. The head-mounted display apparatus includes: a mobile device tracing information processing unit for receiving position information or orientation information of a mobile device and generating tracing information of the mobile device based on the received position information or orientation information of the mobile device; a gesture processing unit for receiving input information of the mobile device and generating gesture information to change an output format of contents by using the received input information; a rendering unit for generating a predetermined virtually augmented contents image based on the tracing information of the mobile device and the gesture information; and a display unit for displaying the generated virtually augmented contents image.

28 Claims, 17 Drawing Sheets

HEAD MOUNTED DISPLAY APPARATUS AND CONTENTS DISPLAY METHOD

CROSS-REFERENCE TO RELATED APPLICATIONS

The present application is a National Stage of International Application No. PCT/KR2012/005385, filed Jul. 6, 2012, which claims the benefit of KR Patent Application No. 10-2011-0068291, filed on Jul. 11, 2011, the entire disclosures of which are incorporated herein by reference for all purposes.

TECHNICAL FIELD

This disclosure relates to a head-mounted display apparatus and a contents display method, and more particularly, to a head-mounted display apparatus and a contents display method, which utilizes a mobile device.

BACKGROUND ART

The electronic contents market is explosively growing complementary to the terminal market [International Digital Publishing Forum, Yankee group, 2010]. Among contents, books in an electronic form, namely e-book contents, are most abundant and vast and are recognized as the most important contents. The terminal-to-contents platform compositions such as iPad to iBookStore, Kindle to Amazon, and Biscuit to Interpark are good illustrations. However, such e-book contents may be sold only when a terminal allowing the e-book to be read is provided. Therefore, the e-book terminal market is an essential factor of the e-book contents market. Evaluation factors of the e-book terminal include visibility, portability, price, navigation function, annotation function or the like. Among them, the navigation function is a most basic element of a user interface of the e-book and should be natural and efficient in order to meet the satisfaction of users. Even though terminals such as iBooks, Kindle, and eDGe receive attention in the existing market due to distinctive user interfaces, they cannot yet provide a natural support as if a user reads a paper book. As a major problem, users feel inconvenience during navigating in an e-book, namely when a user who is reading a section of the e-book navigates in the e-book to read another section.

First, in US Patent Publication US2010/017518, an e-book utilizing a virtual page turn is implemented by using a display such as an e-book terminal and a computer monitor. However, in a mobile environment, a computer monitor is not available, and the e-book terminal also lays a burden due to its volume and weight.

Second, in an implementation of an e-book disclosed in US Patent Publication US2009/0237367, when moving to a bookmark, a user should 1) call a bookmark menu, 2) choose a page in a bookmarked page list, and 3) click/push the chosen bookmark by means of touch or button manipulation. The three-stage menu selecting process increases cognitive burdens of the user and disturbs reading.

Third, in a conventional e-book, in order to enlarge or reduce a size, a user should touch a screen and make a pinching gesture perform keyboard or mouse manipulations, which are not natural.

Fourth, in an existing e-book, in order to move to a distant position, a user should use a scroll bar (iBooks of iPad) or utilize a graphical user interface (GUI) such as a thumbnail which fills the screen. However, while manipulating graphic objects displayed when the GUI menu is called, a user may forget the contents of the e-book the user was reading.

Fifth, an existing e-book gives only a 'visible feedback' like turning over pages. Therefore, 1) a user cannot feel as if he uses a real book, and 2) a user who is turning over pages fast cannot stop at an accurate position.

RELATED LITERATURES

Patent Literature

US Patent Publication US2010/0175018
US Patent Publication US2009/0237367

DISCLOSURE

Technical Problem

This disclosure is directed to implementing an virtually augmented display image with wide FOV and high resolution regardless of corresponding device's volume and weight.

This disclosure is also directed to implementing a intuitive contents enlarging/reducing function.

This disclosure is also directed to implementing a natural and simple bookmark function through an e-book.

This disclosure is also directed to instinctively implementing a function of turning over pages of an e-book, namely a flipping-through function.

This disclosure is also directed to implementing a realistic e-book interface by using sound and vibration feedbacks.

Technical Solution

In one general aspect of the present disclosure, there is provided a head-mounted display apparatus, which includes: a mobile device tracing information processing unit for receiving position information or orientation information of a mobile device and generating tracing information of the mobile device based on the received position information or orientation information of the mobile device; a gesture processing unit for receiving input information of the mobile device and generating gesture information to change an output format of contents by using the received input information; a rendering unit for generating a predetermined virtually augmented contents image based on the tracing information of the mobile device and the gesture information; and a display unit for displaying the generated virtually augmented contents image.

In another general aspect of the present disclosure, there is provided a contents display system, which includes: a head-mounted display apparatus including: a mobile device tracing information processing unit for receiving movement information of a mobile device and generating tracing information of the mobile device based on the received movement information of the mobile device; a gesture processing unit for receiving input information with respect to the mobile device and changing an output format of contents by using the received input information; a rendering unit for generating predetermined virtually augmented contents image based on the tracing information of the mobile device and the gesture information; and a display unit for displaying the generated virtually augmented contents image; and the mobile device communicating with the head-mounted display.

In another general aspect of the present disclosure, there is provided a contents display method, which includes: receiving position information or orientation information of a mobile device; generating tracing information of the mobile device based on the received position information or orientation information of the mobile device; receiving input information with respect to the mobile device; generating gesture information to change an output format of contents by using the received input information; generating a predetermined virtually augmented contents image based on the tracing information of the mobile device and the gesture information; and displaying the generated virtually augmented contents image.

Advantageous Effects

According to one aspect of the present disclosure, it is possible to break from limited contents visibility of an e-book interface, caused by a small-sized display or screen which gives burdens on volume and weight. In other words, without carrying a weight e-book terminal, a user may read a book with high resolution and a wide field of view rather than reading e-book contents on a small screen of a smart phone.

According to another aspect of the present disclosure, an image of an e-book may be enlarged or reduced by a simple manipulation using a mobile device as a multi-modal controller.

According to another aspect of the present disclosure, a user may use an intuitive bookmark function of an e-book by using a simple bookmarking gesture.

According to another aspect of the present disclosure, a user may simply flip through an e-book naturally without being disturbed while reading the e-book.

DESCRIPTION OF DRAWINGS

The above and other aspects, features and advantages of the disclosed exemplary embodiments will be more apparent from the following detailed description taken in conjunction with the accompanying drawings in which.

MODE FOR INVENTION

Figure 1A:
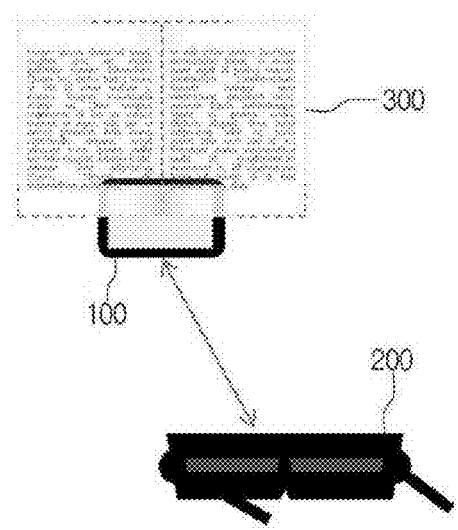
FIG. 1a shows a head-mounted display apparatus, a mobile device and virtually augmented contents image according to an embodiment of the present disclosure.

The present disclosure was supported by the Global Frontier R&D Program on <Human-centered Interaction for Coexistence> funded by the National Research Foundation of Korea grant funded by the Korean Government (MEST) (NRF-M1AXA003-2011-0031380), and the KIST Institutional Program (2E22880).

The present disclosure will be described in detail with reference to the accompanying drawings illustrating specific embodiments as examples to embody the present disclosure.

The embodiments will be described for a person skilled in the art to sufficiently embody the present disclosure. Various embodiments of the present disclosure are different from each other, but it should be understood that it is not necessary to be mutually exclusive. For example, specific shapes, structures, and characteristics described herein may be embodied as the other embodiment without deviating from the spirit and scope of the present disclosure. It should be understood that the positions and disposition of individual constituent elements in the disclosed embodiments may be changed without deviating from the spirit and scope of the present disclosure. Accordingly, the detailed description to be described later is not understood as limitative meaning, and the scope of the present disclosure is limited only by accompanying claims with the entire scope equivalent to what is claimed by claims, as long as the scope is appropriately described. In the drawings, similar reference numerals and signs are the same over various aspects or indicate similar functions.

FIG. 1a shows a head-mounted display apparatus 200, a mobile device 100 and an virtually augmented contents image 300 according to an embodiment of the present disclosure.

The mobile device 100 may be implemented in various ways and may include various features. For example, the mobile device 100 may be various types of processing devices such as cellular devices, PDA, digital cameras, digital camera-enable mobile phones, and portable computers. Particularly, the mobile device 100 may be a smart phone having a display, a touch sensor, a motion sensor, a vibrator, a speaker, a communication module or the like, or on occasions, a small smart pad. In addition, the mobile device 100 may include a processing system for allowing communication between at least one software application and an operating system by being equipped with, for example, a processor, an operating system and an application program interface (API). Further, the processing system of the mobile device 100 may be configured to perform various kinds of software applications 120. The mobile device 100 may communicate with the head-mounted display apparatus 200 or other external devices (not shown), and any hardware or software capable of communicating may be loaded thereon. All transmittable information including information of various sensors in the mobile device 100, voice feedback information, and vibration feedback information may be transmitted to or received in the head-mounted display apparatus 200 or other external devices (not shown) through the mobile device 100. The communication method may be WiFi or BlueTooth, without being limited thereto.

The head-mounted display apparatus 200 is a device for displaying an image, which allows a predetermined image to be focused on a single eye or both eyes by using an optical device included therein at a position adjacent to the eyes of a user. In other words, the head-mounted display apparatus 200 enlarges an image output from a display device by using an optical system and allows a user to watch a virtual image as if the user watches an image on a large screen at a certain distance. The head-mounted display apparatus 200 is shaped to be worn on the head like a goggle and thus is also called a head-mounted display. However, the head-mounted display apparatus defined in the specification means all kinds of image displaying device capable of focusing a predetermined image on a single eye or both eyes of a user, without being limited to MID generally used. The head-mounted display 200 may include LCD-, OLED-, or projector-type MID, and its form is not limited.

The virtually augmented contents image 300 is a display image provided to a user by the head-mounted display apparatus 200, on which various motions of the mobile device 100 and various gestures of a user are reflected. This process will be described briefly. First, the head-mounted display apparatus 200 traces the movement of the mobile device 100 with more or less 6-dimensional degree of freedom. If the movement of the mobile device 100 is traced, the head-mounted display apparatus 200 overlays the content on the mobile device 100 according to the movement of the mobile device 100, and then renders and displays the contents.

The virtually augmented contents image 300 moves along with the movement of the mobile device, and if various gestures are input, the virtually augmented contents image 300 is changed according to gesture information and then displayed.

Figure 1B:
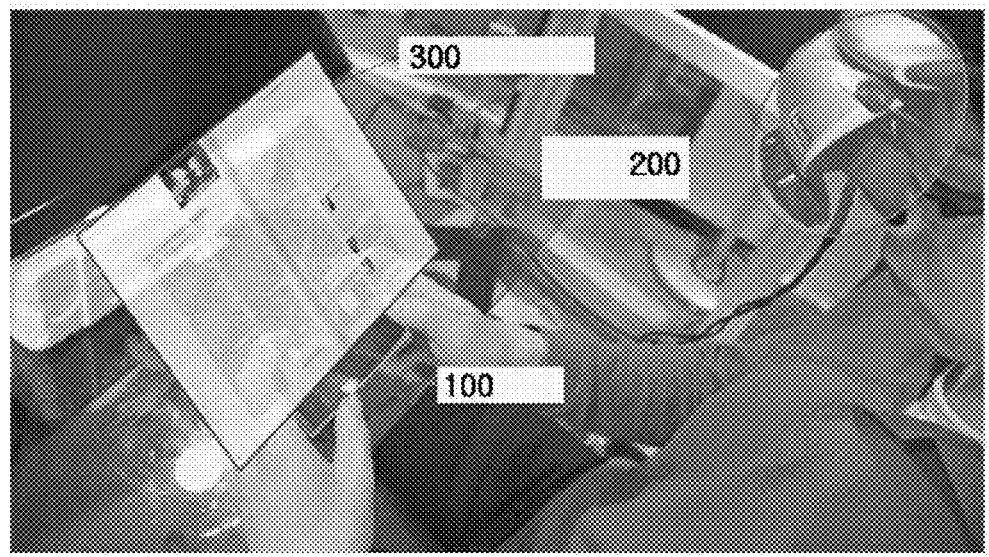
FIG. 1b is an implementation example of the head-mounted display apparatus, the mobile device and virtually augmented contents image according to an embodiment of the present disclosure.

FIG. 1b shows an implementation example of the head-mounted display apparatus, the mobile device and the virtually augmented contents image according to an embodiment of the present disclosure. The mobile device 100 uses a smart phone, the head-mounted display apparatus 200 uses IIMD available in the market, and the contents is e-book contents.

Figure 2:
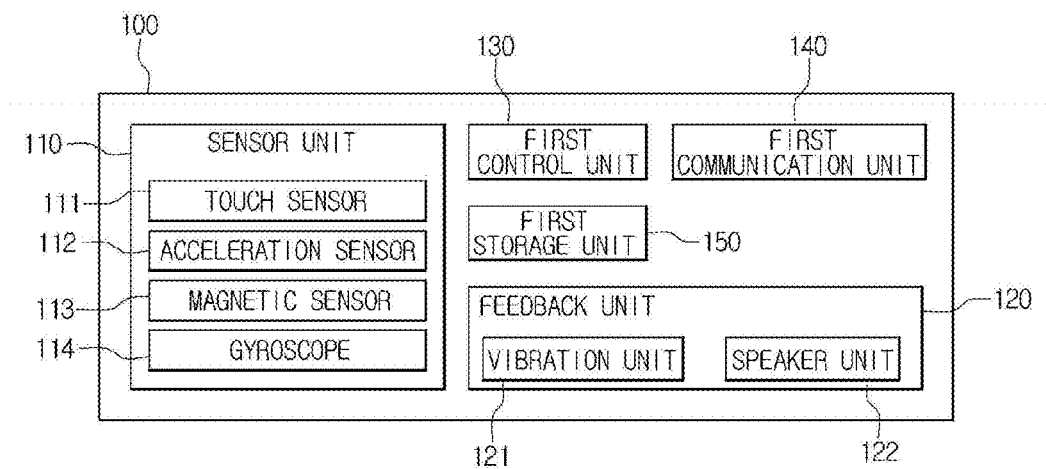
FIG. 2 shows an inner configuration of a mobile device according to an embodiment of the present disclosure.

FIG. 2 shows an inner configuration of the mobile device 100 according to an embodiment of the present disclosure. The mobile device may include a sensor unit 110, a feedback unit 120, a first control unit 130, a first communication unit 140, and a first storage unit 150.

The sensor unit 110 plays a role of sensing information about various external inputs and may include a touch sensor 111, an acceleration sensor 112, a magnetic sensor 113, and a gyroscope 114. The touch sensor 111 plays a role of sensing a touch input of a user to the mobile device 100. The touch sensor 111 may sense not only a single touch but also multi touches. The form of a touch input may be classified according to a position of a touched point, statuses of a point such as a new point, a moved point and a released point, or several touched gestures such as tab, double tab, panning, flicking, drag and drop, pinching and stretching. The acceleration sensor 112 may measure an acceleration applied according to gravity or a movement of the mobile device 100. The magnetic sensor 113 may measure an intensity of a magnetic field around the mobile device 100. The gyroscope 114 is also called a gyro sensor and recognizes 3-dimensional movement of the mobile device 100. The gyroscope 114 may have only two axes or only three axes. In one embodiment, each sensor may be a 3-axis sensor, but it may also be a degraded sensor with one or two axes. In addition, the sensors may be divided according to each axis.

The feedback unit 120 plays a role of controlling a vibration or sound output of the mobile device 100. The feedback unit may include a vibration unit 120 for generating a vibration output and a speaker unit 122 for generating a sound output. In a case where a specific gesture is processed in the head-mounted display apparatus 200, according to feedback control information received from the head-mounted display apparatus 200 or an external device, the vibration unit 120 generates a vibration output or the speaker unit 122 generates a sound output. On occasions, both outputs may be generated simultaneously.

The first communication unit 140 may perform communication by using at least one communication method selected from the group consisting of wireless Local Area Network (LAN), Metropolitan Area Network (MAN), Global System for Mobile Network (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VoIP), World Interoperability for Microwave Access (Wi-MAX) and ultrasonic communication. However, depending on embodiments, the first communication unit 140 may not be separately provided but be included as a single function of an additional component of the mobile device 100. For example, the touch sensor 111 of the sensor unit 110 may transmit touch information directly to an external device, or the speaker unit 122 of the feedback unit 120 may directly receive feedback control information.

The first storage unit 150 plays a role of storing general information for controlling or operating all components of the mobile device 100. Various kinds of activity history information of components may be stored in the first storage unit 150.

The first control unit 130 plays a role of operating and controlling the sensor unit 110, the feedback unit 120, the first communication unit 140, and the first storage unit 150.

Figure 3:
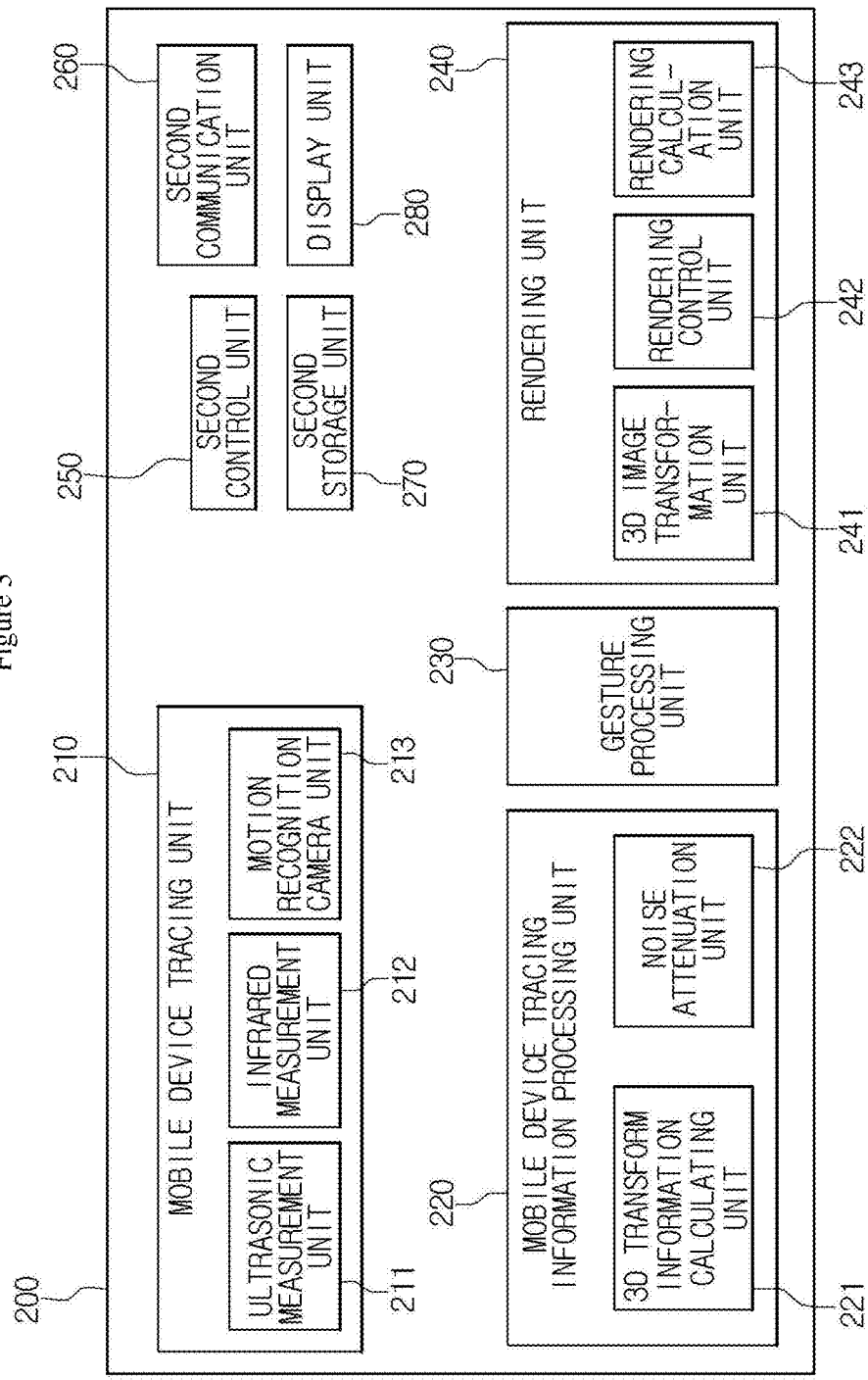
FIG. 3 shows an inner configuration of a head-mounted display apparatus according to an embodiment of the present disclosure.

FIG. 3 shows an inner configuration of the head-mounted display apparatus 200 according to an embodiment of the present disclosure. The head-mounted display apparatus 200 may include a mobile device tracing unit 210, a mobile device tracing information processing unit 220, a gesture processing unit 230, and a rendering unit 240.

The mobile device tracing unit 210 plays a role of tracing the mobile device 100 with more or less 6-dimensional degree of freedom and obtaining position information or orientation information of the mobile device 100. The position information of the mobile device 100 has a relation to a present position of the mobile device 100, and the orientation information of the mobile device 100 has a relation to a 3-dimensional orientation of the mobile device.

In an embodiment, the mobile device tracing unit 210 may include an ultrasonic measurement unit 211 using ultrasonic waves, an infrared measurement unit 212 using infrared rays, and a motion recognition camera unit 213 using a motion recognition camera. Though not shown in the figures, a marker may also be included as a recognition camera. From them, information about relative or absolute positions of the mobile device 100 and the head-mounted display apparatus 200, namely position information, may be obtained. The mobile device tracing unit 210 may also obtain orientation information of the mobile device 100, from the acceleration sensor 112, the magnetic sensor 113 or the like of the mobile device 100.

The mobile device tracing information processing unit 220 plays a role of determining an actual display position and a orientation of the virtually augmented contents image 300 by using the position information and the orientation information of the mobile device 100, obtained by the mobile device tracing unit 210. In other words, tracing information of the mobile device is generated by using the movement information and the orientation information.

The position of the virtually augmented image may be calculated by using information about relative positions of the mobile device 100 and the head-mounted display apparatus 200, obtained by the mobile device tracing unit 210. The effect of overlaying the mobile device with the virtually augmented contents image 300 is obtained by separating the virtually augmented contents image 300 from the mobile device 100 by a predetermined distance and setting a point on a line connecting the position of the mobile device 100 and the position of the head-mounted display apparatus 200 as a center of the virtually augmented contents image 300.

However, the process of determining a orientation of the virtually augmented contents image 300 is more complicated.

In order to determine a orientation, 3-dimensional rotational transform information is required. The 3-dimensional rotational transform information allows the 3-dimensional absolute orientation of the mobile device 100 to coincide with a 3-dimensional absolute orientation of the virtually augmented image 300 of the contents. In other words, the 3-dimensional rotational transform information allows the rotation of the mobile device to be traced. The 3-dimensional rotational transform information is obtained by calculating a orientation transform from an initial orientation of the mobile device to a present orientation.

In an embodiment, first, present orientation information including data of the acceleration sensor 112 and the magnetic sensor 113 is received from the acceleration sensor 112 and the magnetic sensor 113. After that, present orientation information free from noise is obtained by the noise attenuation unit 222. The noise attenuation unit 222 plays a role of removing noise of an input value and may include at least one filter selected from the group consisting of a low pass filter, a Kalman filter, an extended Kalman filter, a unscented Kalman filter and a particle filter. The 3-dimensional transform information calculating unit 221 compares the present orientation information free from noise with predefined 'initial orientation information' and obtains 3-dimensional rotational transform information.

The initial orientation information may be expressed by a matrix Dinit, the present orientation information free from noise may be expressed by a matrix Dcur, and the 3-dimensional rotational transform information may be expressed by a rotation matrix Rcur. The rotation matrix Rcur from the initial orientation of the mobile device to the present orientation may be obtained by comparing Dcur with Dinit.

In an embodiment, a method for obtaining 3-dimensional rotational transform information by utilizing a simple low pass filter will be described.

Assuming that initial data of the acceleration sensor 112 is Accinit, present data of the acceleration sensor 112 is Acccur, and filtered data of the acceleration sensor 112 is Acccur_f, the filtered data Acccur_f of the acceleration sensor 112 passing through a simple low pass filter is expressed as Equation 1 below.

$$Acc^{cur\_f}=c^a \cdot Acc^{cur}(1-c^a) \cdot Acc^{cur\_f} \qquad [\text{Equation 1}]$$

Here, ca represents a sensitivity constant of a signal of the acceleration sensor 112.

In addition, assuming that initial data of the magnetic sensor 113 is Maginit, present data of the magnetic sensor 113 is Magcur, and filtered data of the magnetic sensor 113 is Magcur_f, the filtered data Magcur_f of the magnetic sensor 113 passing through a simple low pass filter is expressed as Equation 2 below.

$$Mag^{cur\_f}=c^m \cdot Mag^{cur}+(1-c^m) \cdot Mag^{cur\_f} \qquad [\text{Equation 2}]$$

Here, cm represents a sensitivity constant of a compass signal.

A rotation matrix may be obtained as follows by utilizing the filtered data of the acceleration sensor 112 and the filtered data of the magnetic sensor 113, which have been given as above.

R (Acc, Mag) is assumed as a rotation matrix in a world coordinate system, which is converted into a coordinate system where the orientation of Mag is an x axis, the orientation of Nmrl0 is a y axis, and the orientation of Nmrl1 is a z axis. In all operations below, matrixes are expressed in a column major method.

Nmrl0 and Nmrl1 may be expressed as Equation 3 below.

$$Nmrl0=unit(Acc \text{ cross } Mag)$$

$$Nmrl1=unit(Mag \text{ cross } Nmrl0) \qquad [\text{Equation 3}]$$

In Equation 3, the unit( ) represents normalization into a unit vector with a length of 1, and the cross represents cross product operation. As a result, R (Acc, Mag) may be expressed as Equation 4 below.

$$R(Acc,Mag)=\{Mag,Nmrl0,Nmrl1\} \quad \text{[Equation 4]}$$

By using the initial orientation information and the present orientation information given as above, R (Accinit, Maginit), which is a matrix of the initial sensor data, and R (Acccur_f, Magcur_f), which is a matrix of the filtered present sensor data, are obtained. After that, if these matrixes are used as a rotation matrix of the virtually augmented contents image 300, the absolute orientation of the mobile device 100 may be coincided with the 3-dimensional orientation of the virtually augmented contents image 300. In other words, if the rotation matrix is expressed by Rcur_f, Equation 5 below may be derived.

$$R^{cur\_f}=R(Acc^{init},Mag^{init})\cdot(R(Acc^{cur\_f},Mag^{cur\_f})^{-1}) \quad \text{[Equation 5]}$$

In the above embodiment, the method of firstly removing noise by filtering and then obtaining 3-dimensional rotational transform information (a rotation matrix) has been described. Differently from this method, it is also possible to obtain 3-dimensional rotational transform information and then remove noise. In this case, Spherical Linear Interpolation (SLERP) using interpolation of Quarternion in order to remove noise may be used (K. Shoemake, "Animating rotation with quaternion curves," ACM SIGGRAPH computer graphics, vol. 19, no. 3, pp. 245-254, 1985). This method uses the same method as the above method of firstly removing noise when calculating a rotation matrix.

SLERP will be described below. First, the present orientation information where noise is not attenuated is compared with the 'initial orientation information' to obtain a rotation matrix. In other words, a matrix representing a present rotation orientation is obtained. Assuming that a rotation matrix, not yet filtered, is expressed by Rcur, Equation 6 below may be derived.

$$R^{cur}=R(Acc^{init},Mag^{init})\cdot(R(Acc^{cur},Mag^{cur})^{-1}) \quad \text{[Equation 6]}$$

Equation 6 is very similar to Equation 5. However, since filtering is not yet performed, Acccur and Magcur are instantly used instead of Acccur_f and Magcur_f. After obtaining the rotation matrix as described above, a rotation matrix representing an absolute orientation is converted into a Quarternion form. In other words, the rotation matrix Rcur is converted into Qcur which is a Quarternion form. Quarternion is improved in expressing axis and angle of the rotation matrix, and Quarternion shows three variables relating to a rotation axis and one variable relating to a rotation angle with a single 4-dimensional variable.

After that, low pass filtering is performed to the rotation information converted into a Quarternion form, by means of SLERP which is an interpolation method. In Equation 7 below, Qcur converted into a Quarternion form is mixed with Quarternion Qcur_f, which stores the filtered result, and then low band filtering is performed thereto.

$$Q^{cur\_f}=\text{Slerp}(Q^{cur\_f},Q^{cur},q^a) \quad \text{[Equation 7]}$$

Here, qa represents a sensitivity constant of a signal of the acceleration sensor 112 and satisfies the condition. After that, the filtered Quarternion Qcur_f may be converted into a rotation matrix to obtain a rotation matrix Rcur_f which is 3-dimensional rotational transform information. Therefore, the tracing information of the mobile device including the position information and the 3-dimensional transform information of the virtually augmented image is generated.

Figure 4A:
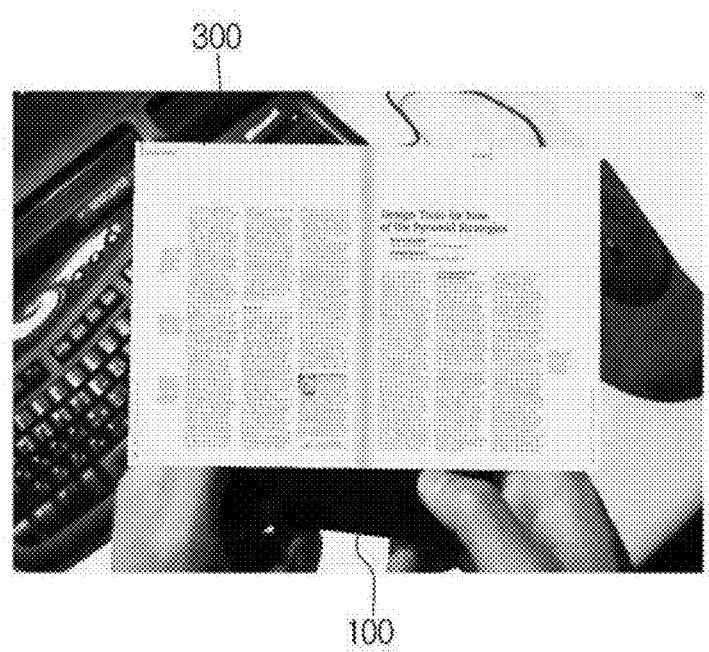
FIG. 4a shows a first implementation example of an virtually augmented contents image according to an embodiment of the present disclosure.
Figure 4B:
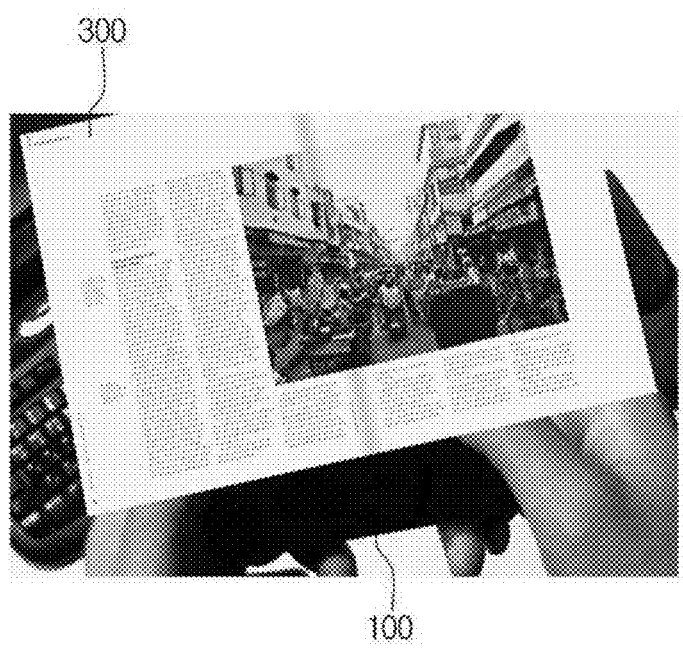
FIG. 4b shows a second implementation example of an virtually augmented contents image according to an embodiment of the present disclosure.

FIGS. 4a and 4b show a first implementation example and a second implementation example of an virtually augmented contents image according to an embodiment of the present disclosure. The virtually augmented contents image 300 is displayed according to the orientation in which the mobile device 100 is placed. If the mobile device 100 depicted in FIG. 4a is rotated by about 30 degrees in a counterclockwise direction like the mobile device 100 depicted in FIG. 4b, the virtually augmented contents image 300 also rotates accordingly.

The gesture processing unit 230 plays a role of receiving input information with respect to the mobile device and generating gesture information which changes an output format of contents by using the received input information. The input information input to the gesture processing unit may be various touches or motions input to the mobile device 100. The touch input may have a form of a sensor input touched by the above touch sensor, which allows not only a single touch but also multi touches, and the form of the touch input may be a position of a touched point, a status of a point such as a new point, a moved point and a released point, or several complicated touched inputs such as tab, double tab, panning, flicking, drag and drop, pinching and stretching. In addition, various motions such as inclining or shaking the mobile device 100 or voices may be input information with respect to the mobile device 100. However, the present disclosure is not limited thereto, and all kinds of effective inputs may be used as an input to a smart device. In case of a voice input, the head-mounted display apparatus 200 may directly obtain the input information, instead of the mobile device 100. The case of detailed gestures will be described later with reference to FIG. 5.

The rendering unit 240 plays a role of generating a predetermined virtually augmented contents image based on the tracing information of the mobile device and the gesture information. The generated virtually augmented contents image is transmitted to the display unit. The rendering unit 240 may include a 3-dimensional image transformation unit 241, a rendering control unit 242, and a rendering calculation unit 243. The 3-dimensional image transformation unit 241 plays a role of spatially transforming predetermined contents based on the tracing information of the mobile device and the gesture information and generating transform information of 3-dimensional virtually augmented image. The rendering control unit 242 plays a role of controlling properties of contents to be rendered and rendering characteristics. The rendering calculation unit 243 plays a role of generating and transmitting an virtually augmented contents image based on the transform information of 3-dimensional virtually augmented image generated by the 3-dimensional image transformation unit 241 and the properties of contents and rendering characteristics controlled by the rendering control unit 242. The transmitting role may also be performed by a separate communication unit.

The display unit 280 plays a role of displaying the virtually augmented contents image generated by the rendering unit 240. The display unit 280 may employ Light Emitting Diode (LED), Organic Light Emitting Display (OLED), Light Emitting Polymer (LEP), Electro-Luminescence (EL) Element, Field Emission Display (FED), Polymer Light Emitting Display (PLED) or the like.

The second communication unit 260 may perform communication by using at least one communication method selected from the group consisting of wireless Local Area Network (LAN), Metropolitan Area Network (MAN), Global System for Mobile Network (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VoIP), World Interoperability for Microwave Access (Wi-MAX) and ultrasonic communication. However, depending on embodiments, the second communication unit 260 may not be separately provided but be included as a single function of an additional component of the head-mounted display apparatus 200.

The feedback control unit 290 plays a role of generating feedback control information, which controls the feedback unit of the mobile terminal to generate a sound or vibration feedback, based on the gesture information generated by the gesture determining unit, and transmitting the feedback control information to the mobile device. Depending on embodiments, the feedback control information may be transmitted by means of the second communication unit 260. In addition, in another embodiment, the head-mounted display apparatus may include a sound feedback unit (not shown) in order to perform sound feedback to a user. In this case, the feedback control unit 290 plays a role of controlling the sound feedback unit by generating feedback control information which controls the sound feedback unit in the head-mounted display apparatus to generate a sound feedback based on the gesture information.

The second storage unit 270 plays a role of storing general information for controlling or operating all components of the head-mounted display apparatus 200. Various kinds of kinds of activity history information of components may be stored in the second storage unit 270.

The second control unit 250 plays a role of operating and controlling the mobile device tracing unit 200, the mobile device tracing information processing unit 220, the gesture processing unit 230, the rendering unit 240, the second communication unit 260, the second storage unit 270, and the display unit 280.

Figure 5:
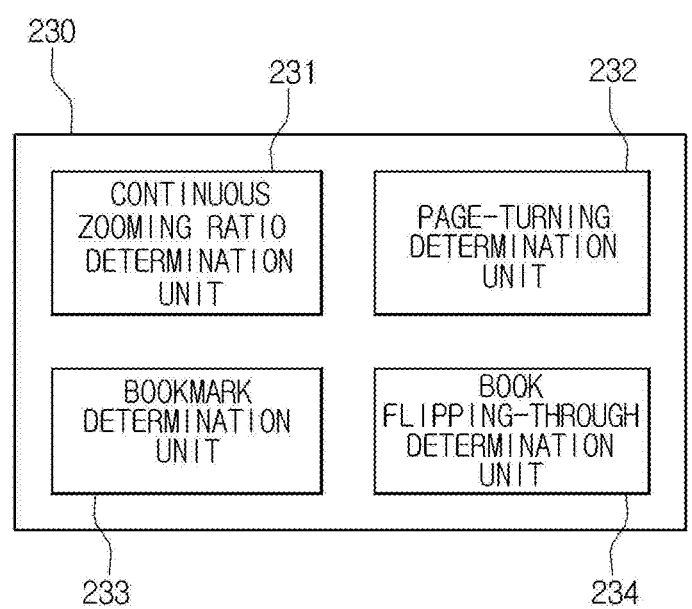
FIG. 5 shows an inner configuration of a gesture processing unit according to an embodiment of the present disclosure.

FIG. 5 shows an inner configuration of the gesture processing unit according to an embodiment of the present disclosure. The gesture processing unit 230 may include a continuous zooming ratio determination unit 231, a page-turning determination unit 232, a bookmark determination unit 233, and a book flipping-through determination unit 234.

Figure 6A:
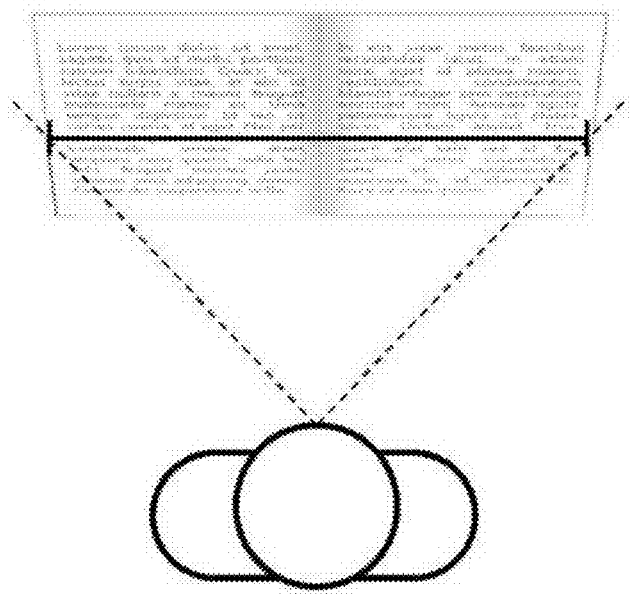
FIG. 6a is a diagram showing a continuous zoom gesture according to an embodiment of the present disclosure.
Figure 6B:
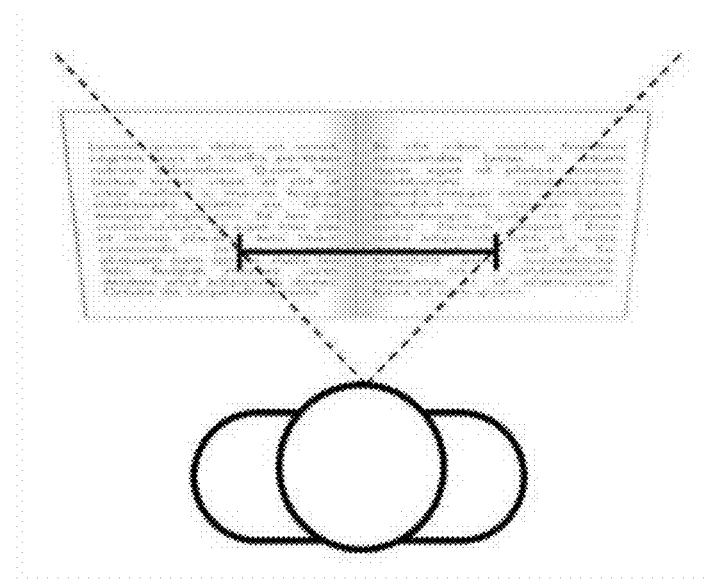
FIG. 6b is a diagram showing a continuous zoom gesture according to an embodiment of the present disclosure.
Figure 6C:
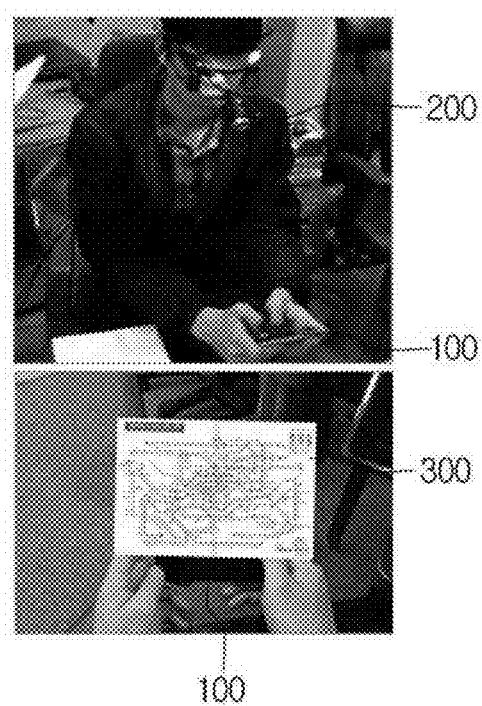
FIG. 6c is a first implementation example showing the change of an virtually augmented contents image with respect to a continuous zoom gesture according to an embodiment of the present disclosure.
Figure 6D:
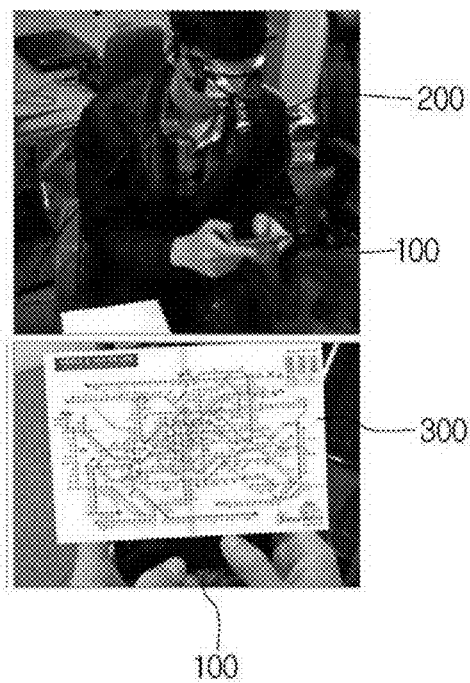
FIG. 6d is a second implementation example showing the change of an virtually augmented contents image with respect to a continuous zoom gesture according to an embodiment of the present disclosure.
Figure 6E:
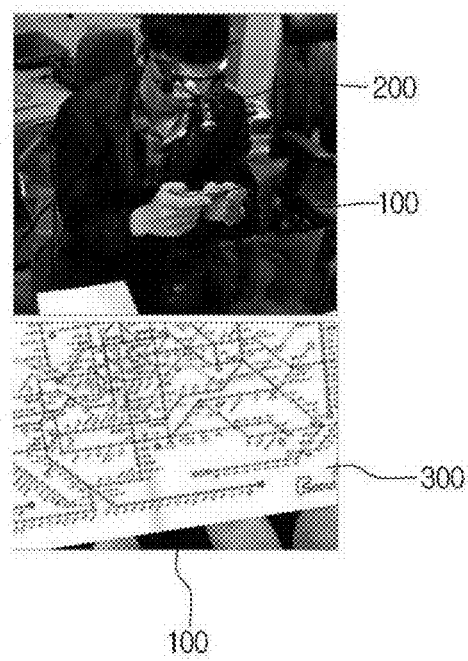
FIG. 6e is a third implementation example showing the change of an virtually augmented contents image with respect to a continuous zoom gesture according to an embodiment of the present disclosure.

The continuous zooming ratio determination unit 231 plays a role of generating first gesture information which changes a size of contents, particularly an e-book virtually augmented contents image, at a predetermined ratio based on the position information of the head-mounted display apparatus 200 and the mobile device 100. In an embodiment, in a state where the virtually augmented contents image is virtually augmented and visualized as if it is adhered to the mobile device, if the mobile device moves close to the eye of a user, the virtually augmented contents image 300 is enlarged, and if the mobile device moves away from the eye, the virtually augmented contents image 300 is reduced. In addition, in order to enlarge a specific region, the specific region of the virtually augmented contents image may be pulled close to the eye. FIGS. 6a and 6b are diagrams showing continuous zoom gestures according to an embodiment of the present disclosure. Referring to FIG. 6a, if the mobile device 100 is pulled back, the image is reduced, and with reference to FIG. 6b, if the mobile device 100 is pulled forward, the image is enlarged. FIGS. 6c to 6e are actual implementation examples showing the change of an virtually augmented image with respect to a continuous zoom gesture according to an embodiment of the present disclosure, and the case where the mobile device 100 is moved close to the eye is shown as three time-series stages in FIGS. 6c, 6d and 6e. If the mobile device 100 is moved close to the eye, the virtually augmented contents image is enlarged. In addition, if a specific region is moved close to the eye in order to enlarge the specific region of the contents, only the specific region may be enlarged.

Figure 7A:
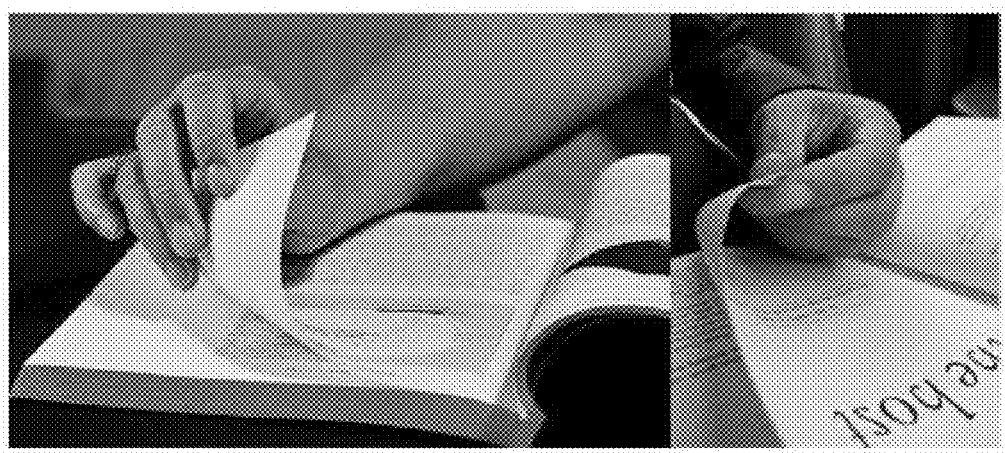
FIG. 7a is a diagram showing a page-turning gesture according to an embodiment of the present disclosure.
Figure 7B:
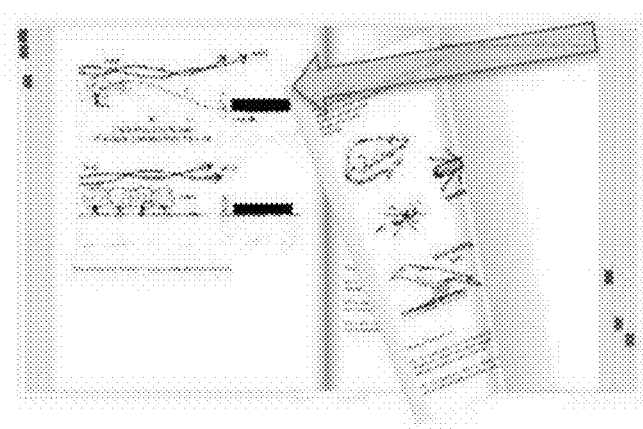
FIG. 7b is a diagram showing a page-turning gesture according to an embodiment of the present disclosure.
Figure 7C:
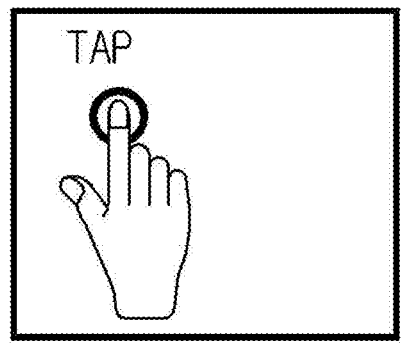
FIG. 7c is a diagram showing a tap touch according to an embodiment of the present disclosure.
Figure 7D:
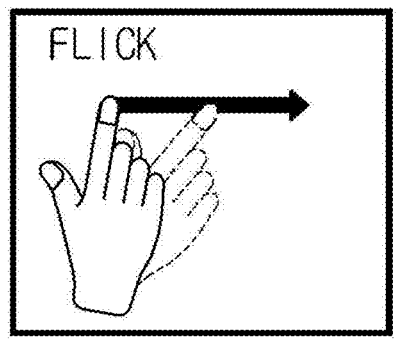
FIG. 7d is a diagram showing a flick touch according to an embodiment of the present disclosure.
Figure 7E:
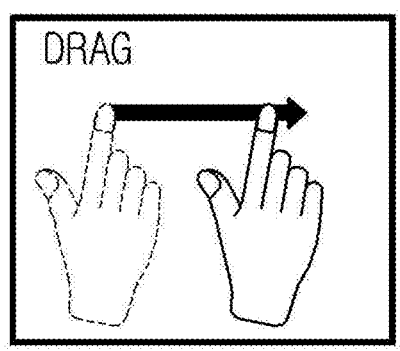
FIG. 7e is a diagram showing a drag touch according to an embodiment of the present disclosure.
Figure 7F:
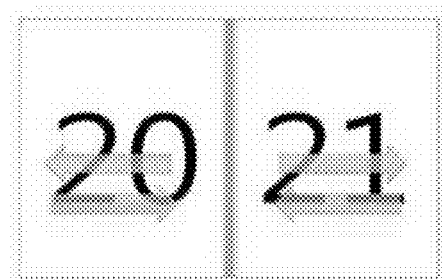
FIG. 7f is a diagram showing the orientation of a page-turning gesture according to an embodiment of the present disclosure.

The page-turning determination unit 232 plays a role of receiving predetermined second input information with respect to the mobile device and generating second gesture information where a first page of contents, particularly an e-book virtually augmented contents image, is shifted to a second page. In other words, if a specific input is received, a figure of turning over a page of the e-book is displayed to the user, and the page of the e-book is actually changed. As shown in FIGS. 7a and 7b, the page-turning determination unit 232 determines a gesture of turning over a page. In an embodiment, based on right and left pages of the e-book contents in FIG. 7b, if the right page is tapped as shown in FIG. 7c, the page is turned over forwards. This represents a gesture when a book is read in a forward direction. If the left page is tapped on the contrary, the page is turned over backward, which represents a gesture of reading a book in a reverse direction. In another embodiment, if a flick is made in the right direction as shown in FIG. 7d, the page is turned over backwards. If a flick is made in the left direction on the contrary, the page is turned over forwards. In still another embodiment, if a page is dragged in the right (or, left) direction as shown in FIG. 7e, the page is turned over backwards (or, forwards), similar to FIG. 7d. However, the page may be folded along a touch point during dragging so that a rear page or a front page may be seen in advance. FIG. 7b shows the actual change of an virtually augmented contents image by dragging. In case of using an actual book, a user grips an end of a page and shifts to another page, and so a left flick is generally used at a right page and a right flick is generally used at a left page. For this reason, the right flick at a right page and the left flick at a left page, which are not frequently used, may be endowed with a separate additional function.

Figure 8A:
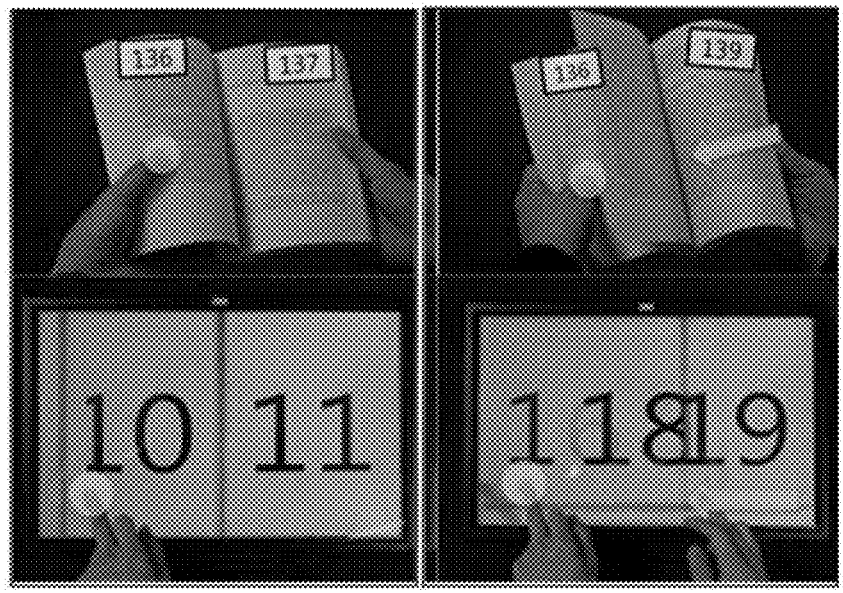
FIG. 8a is a first implementation example showing the change of an virtually augmented image with respect to a bookmark gesture according to an embodiment of the present disclosure.
Figure 8B:
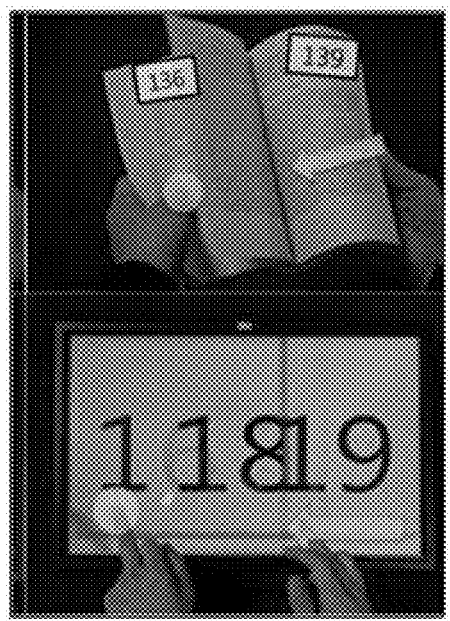
FIG. 8b is a second implementation example showing the change of an virtually augmented image with respect to a bookmark gesture according to an embodiment of the present disclosure.
Figure 8C:
FIG. 8c is a third implementation example showing the change of an virtually augmented image with respect to a bookmark gesture according to an embodiment of the present disclosure.
Figure 8D:
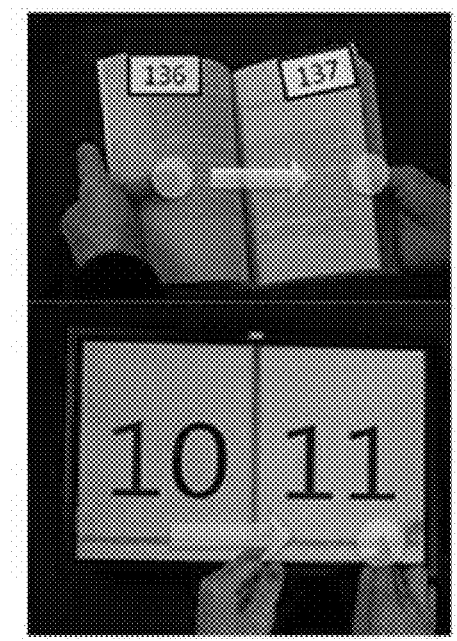
FIG. 8d is a fourth implementation example showing the change of an virtually augmented image with respect to a bookmark gesture according to an embodiment of the present disclosure.
Figure 8E:
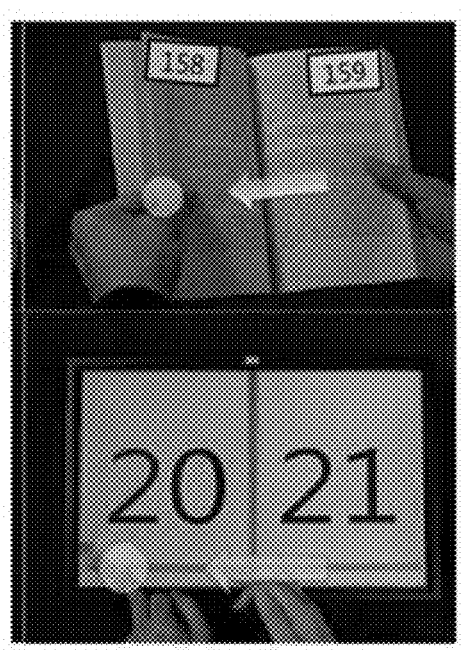
FIG. 8e is a fifth implementation example showing the change of an virtually augmented image with respect to a bookmark gesture according to an embodiment of the present disclosure.

The bookmark determination unit 233 plays a role of receiving predetermined third input information with respect to the mobile device 100, storing a third page of contents, particularly an e-book virtually augmented contents image, and, in case of receiving predetermined fourth input information after the page is stored, the bookmark determination unit 233 plays a role of generating third gesture information which displays the stored third page. When reading a paper book, persons may insert a finger at a certain page in order to instantly return to the page while reading another page. The third gesture is a function which imitates this behavior by using a touch gesture. In an embodiment, if a page is turned over while a touch (touch A) which is a predetermined third input is maintained at one side of the mobile device, the page which is opened at an instant that the touch A is made will be bookmarked. Therefore, if a flick which is a predetermined fourth input is made to the maintained touch A, the user may easily move to the bookmarked page at once. FIGS. 8a to 8e show implementation examples using a touch screen in order to simply explain such a bookmark function. In FIG. 8a, first, the left thumb is inserted at page 136 of the book, in FIGS. 8b and 8c, pages are turned over from page 137 to page 159 of FIG. 8c by using the right hand, and then the right hand is inserted again. After that, if the left thumb is lifted, the user returns to page 136 as shown in FIG. 8d, and if the inserted right hand is lifted, the user may move to page 159 as shown in FIG. 8e. In the present disclosure, if the user touches page 10 with the left middle finger as shown FIG. 8a (the third input), turns over pages from page 11 to page 21 with the right hand as shown in FIGS. 8b and 8c, and makes a flick with the left middle finger as shown in FIG. 8d, page 10 stored before is called. If the user may touch page 21 with the right hand as shown in FIG. 8c after making a flick and makes a flick with the right hand as shown in FIG. 8e after the above flick, the user may return to page 21. The third input and the fourth input are not limited to touches, motions, voices or the like, similar to the input information of the gesture processing unit. In an embodiment, in a state where the third input information is received, namely where a bookmark is made, as shown in the left lower portion of FIGS. 8a to 8e, gesture information where a page is folded may be generated.

Figure 9A:
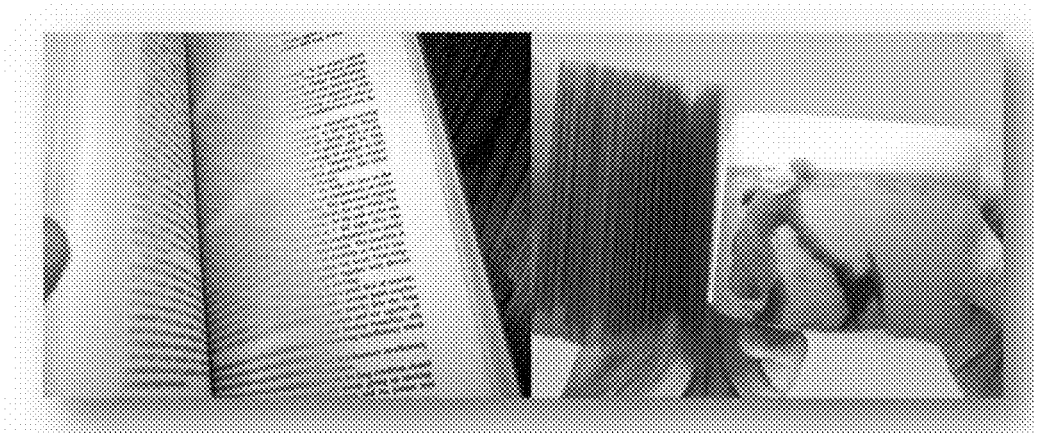
FIG. 9a is a diagram showing a book flipping-through gesture according to an embodiment of the present disclosure.
Figure 9B:
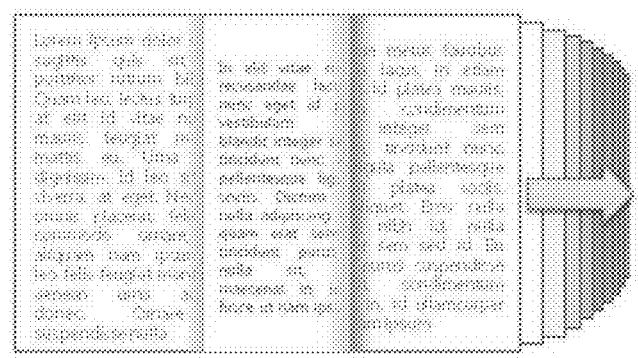
FIG. 9b is a diagram showing a book flipping-through gesture according to an embodiment of the present disclosure.
Figure 9C:
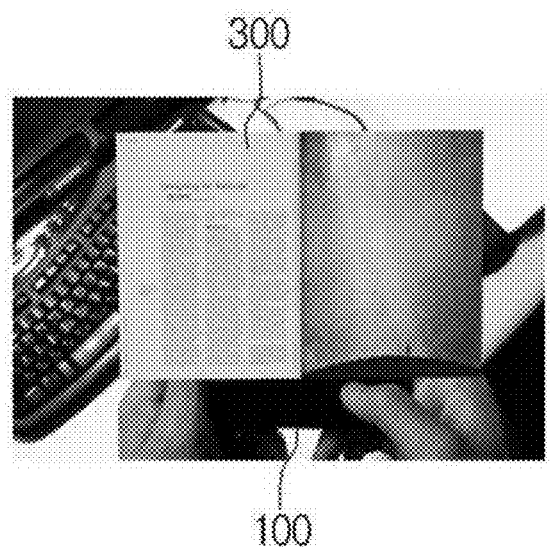
FIG. 9c is a first implementation example showing the change of an virtually augmented image with respect to a book flipping-through gesture according to an embodiment of the present disclosure.
Figure 9D:
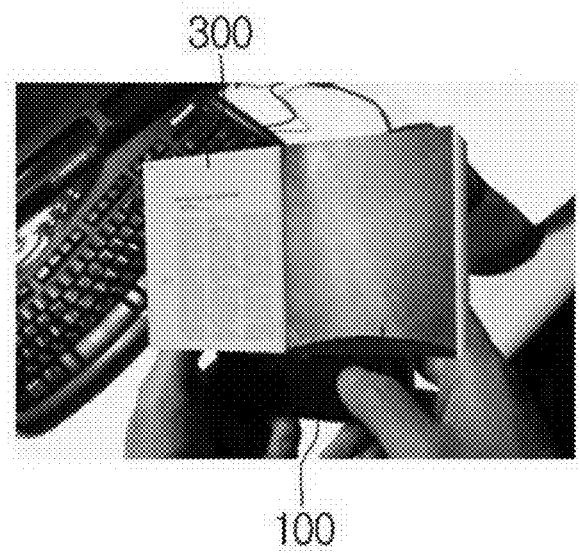
FIG. 9d is a second implementation example showing the change of an virtually augmented image with respect to a book flipping-through gesture according to an embodiment of the present disclosure.

The book flipping-through determination unit 234 plays a role of shifting to an e-book flipping-through mode in the general mode by receiving predetermined fourth input information with respect to the mobile device 100, and generating fourth gesture information to continuously turn over a plurality pages of contents, particularly an e-book contents by receiving predetermined fifth input information. When reading a paper book, persons may grip a side of pages and turn over pages fast as shown in FIG. 9a. The book flipping-through gesture imitates this behavior by using a touch gesture. In order to distinguish a dragging gesture for the book flipping-through gesture and a dragging gesture in a general mode (a mode where pages are turned over one by one), a book flipping-through mode is separately defined, different from the general mode. In the general mode, pages of contents, particularly an e-book contents, are turned over one by one by means of input information such as flicking, dragging and tapping, but in the book flipping-through mode, pages are turned over fast by dragging. Both modes may be shifted by using a motion gesture of inclining the mobile device as shown in FIGS. 9c and 9d, and a specific button input may be received for shifting modes. This is not limited to touches, motions, voices or the like, similar to the input information. In another embodiment, in the book flipping-through mode, a bookmark gesture may also be determined. In addition, in still another embodiment, a touch screen region of the mobile device may be divided so that only a gesture of touching a specific region is operated in the flipping-through (FT) mode and gestures of touching the other regions are operated in the general mode. In further another embodiment, the book flipping-through determination unit may shift to the general mode again from the e-book flipping-through mode by receiving predetermined sixth input information.

Figure 10:
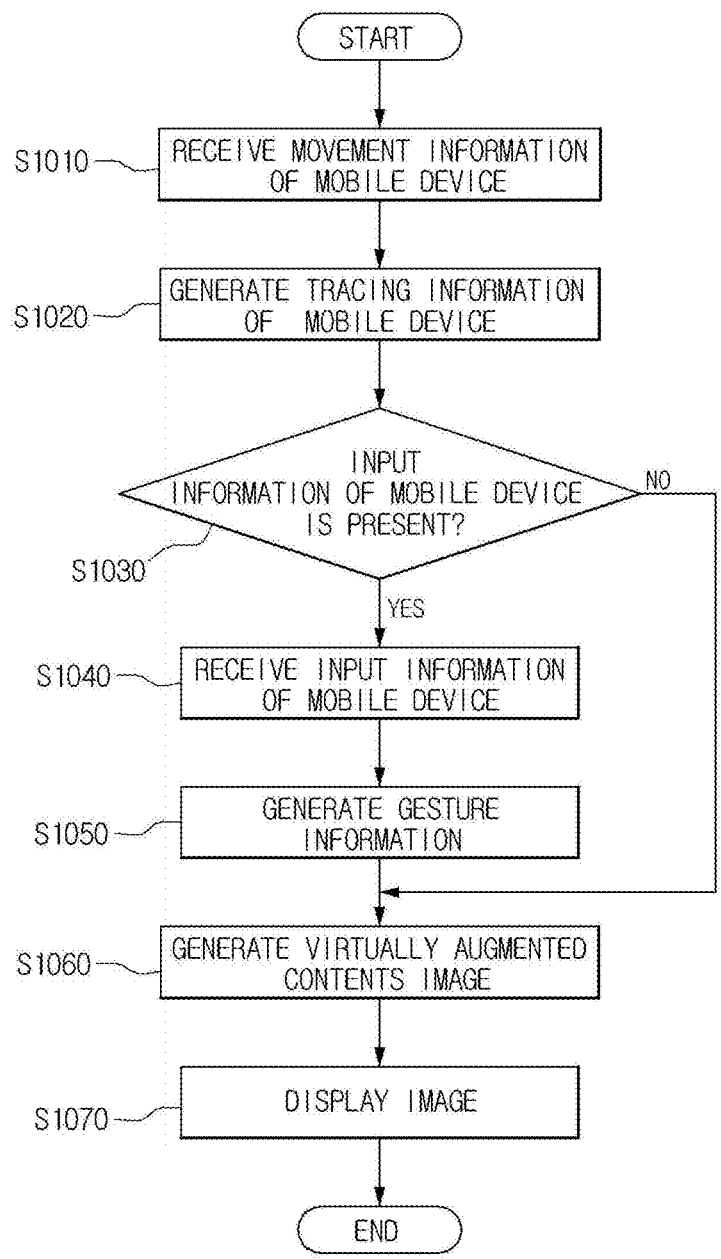
FIG. 10 is a flowchart for illustrating a contents display method for displaying an virtually augmented contents image by using a head-mounted display apparatus.

FIG. 10 is a flowchart for illustrating a contents display method for displaying an virtually augmented contents image by using a head-mounted display apparatus.

First, the head-mounted display apparatus 200 receives movement information (position information or orientation information) of the mobile device 100 (S1010). The head-mounted display apparatus 200 generates tracing information of the mobile device by using the received movement information (S1020). If mobile device input information is not present (NO in S1030), the head-mounted display apparatus 200 generates an virtually augmented contents image according to the tracing information of the mobile device (S1060). If mobile device input information is present (YES in S1030), the head-mounted display apparatus 200 receives mobile device input information (S1040), parses the mobile device input information, and generates gesture information (S1050). The gesture information may include various gestures such as a continuous zoom gesture, a page-turning gesture, a bookmark gesture, and a book flipping-through gesture as described above. After that, the head-mounted display apparatus 200 generates a predetermined virtually augmented contents image by using the tracing information of the mobile device and the gesture information (S1060). The head-mounted display apparatus 200 displays the generated virtually augmented contents image (S1070), and then the contents display method is completed.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof.

Therefore, it is intended that this disclosure not be limited to the particular exemplary embodiments disclosed as the mode for invention contemplated for carrying out this disclosure, but that this disclosure will include all embodiments falling within the scope of the appended claims.

INDUSTRIAL APPLICABILITY

According to one aspect of the present disclosure, it is possible to break from limited contents visibility of an e-book interface, caused by a small-sized display or screen which gives burdens on volume and weight. In other words, without carrying a weight e-book terminal, a user may read a book with high resolution and a wide field of view rather than reading e-book contents on a small screen of a smart phone.

According to another aspect of the present disclosure, an image of an e-book may be enlarged or reduced by a simple manipulation using a mobile device as a multi-modal controller.

According to another aspect of the present disclosure, a user may use an intuitive bookmark function of an e-book by using a simple bookmarking gesture.

According to another aspect of the present disclosure, a user may simply flip through an e-book naturally without being disturbed while reading the e-book.

The invention claimed is:

1. A head-mounted display apparatus, comprising:
   a mobile device tracing information processing unit for receiving position information or orientation information of a mobile device and generating tracing information of the mobile device based on the received position information or orientation information of the mobile device;
   a gesture processing unit for receiving input information of the mobile device and generating gesture information to change an output format of contents by using the received input information;
   a rendering unit for generating a predetermined virtually augmented contents image based on the tracing information of the mobile device and the gesture information; and
   a display unit for displaying the generated virtually augmented contents image.

2. The head-mounted display apparatus according to claim 1, wherein the display unit displays the virtually augmented contents image which overlays the mobile device.

3. The head-mounted display apparatus according to claim 1, further comprising a mobile device tracing unit for generating the position information of the mobile device by tracing a position of the mobile device from a position of the head-mounted display device.

4. The head-mounted display apparatus according to claim 3, wherein the orientation information of the mobile device is generated from any one of an acceleration sensor, a magnetic sensor and a gyroscope of the mobile device.

5. The head-mounted display apparatus according to claim 3, wherein the mobile device tracing information processing unit includes:

a noise attenuation unit for removing noise of the orientation information of the mobile device; and a 3-dimensional transform information calculating unit for generating 3-dimensional rotational transform information about movement from an initial orientation of the mobile device to a present orientation based on the orientation information of the mobile device from which noise is removed, wherein the tracing information of the mobile device is generated based on the position information and the generated 3-dimensional rotational transform information.

6. The head-mounted display apparatus according to claim 3, wherein the mobile device tracing information processing unit includes:

a 3-dimensional transform information calculating unit for generating 3-dimensional rotational transform information by calculating movement from an initial orientation of the mobile device to a present orientation based on the orientation information of the mobile device; and a noise attenuation unit for removing noise of the 3-dimensional rotational transform information, wherein the tracing information of the mobile device is generated based on the position information and the generated 3-dimensional rotational transform information.

7. The head-mounted display apparatus according to claim 1, wherein the rendering unit includes:

a 3-dimensional image transformation unit for generating transform information of 3-dimensional virtually augmented image by spatially transforming the predetermined contents based on the tracing information of the mobile device and the gesture information;

a rendering control unit for controlling properties of the contents to be rendered and rendering characteristics; and rendering calculation unit for generating and transmitting the virtually augmented contents image based of the 3-dimensional virtually augmented image transformation information, the properties of the contents and the rendering characteristics.

8. The head-mounted display apparatus according to claim 1, wherein the predetermined contents is an e-book contents including a plurality of pages.

9. The head-mounted display apparatus according to claim 8, wherein the gesture processing unit includes a continuous zooming ratio determination unit for generating first gesture information which changes a size of the e-book virtually augmented contents image at a first predetermined ratio based on the position information of the mobile device.

10. The head-mounted display apparatus according to claim 8, wherein the gesture processing unit includes a page-turning determination unit for receiving predetermined second input information with respect to the mobile device and generating second gesture information where a first page of the e-book virtually augmented contents image is shifted to a second page of the e-book virtually augmented contents image.

11. The head-mounted display apparatus according to claim 8, wherein the gesture processing unit includes a bookmark determination unit for storing a third page of the e-book virtually augmented contents image by receiving predetermined third input information with respect to the mobile device, and, after the page is stored, for generating third gesture information to display the stored third page by receiving predetermined fourth input information.

12. The head-mounted display apparatus according to claim 8, wherein the gesture processing unit includes a book flipping-through determination unit for shifting from a general mode to an e-book flipping-through mode by receiving predetermined fourth input information with respect to the mobile device, and generating fourth gesture information to continuously turn over a plurality pages of the e-book virtually augmented contents image by receiving predetermined fifth input information.

13. The head-mounted display apparatus according to claim 12, wherein the book flipping-through determination unit shifts to the general mode again by receiving predetermined sixth input information in the shifted e-book flipping-through mode.

14. The head-mounted display apparatus according to claim 1, further comprising a feedback control unit for controlling a feedback unit of the mobile device to generate feedback control information, which generates sound or vibration feedback, based on the gesture information, and transmit the feedback control information to the mobile device.

15. The head-mounted display apparatus according to claim 1, further comprising:

a sound feedback unit for generating a sound feedback according to gesture information; and a feedback control unit for controlling the feedback unit by generating feedback control information which controls the feedback unit of the head-mounted display device to generate a sound feedback, based on the gesture information.

16. A contents display system, comprising:

a head-mounted display apparatus which includes:

a mobile device tracing information processing unit for receiving movement information of a mobile device and generating tracing information of the mobile device based on the received movement information of the mobile device;

a gesture processing unit for receiving input information with respect to the mobile device and changing an output format of contents by using the received input information;

a rendering unit for generating predetermined virtually augmented contents image based on the tracing information of the mobile device and the gesture information; and a display unit for displaying the generated virtually augmented contents image, and the mobile device which communicates with the head-mounted display.

17. A contents display method, comprising:

receiving position information or orientation information of a mobile device;

generating tracing information of the mobile device based on the received position information or orientation information of the mobile device;

receiving input information with respect to the mobile device;

generating gesture information to change an output format of contents by using the received input information;

generating a predetermined virtually augmented contents image based on the tracing information of the mobile device and the gesture information; and displaying the generated virtually augmented contents image.

18. The contents display method according to claim 17, wherein said displaying of the virtually augmented contents image further includes displaying the virtually augmented contents image which overlays the mobile device.

19. The contents display method according to claim 17, wherein said receiving of position information or orientation information further includes receiving movement information of the mobile device, which is generated by tracing a position of the mobile device from a position of the head-mounted display device.

20. The contents display method according to claim 17, wherein said generating of tracing information of the mobile device further includes:
    generating 3-dimensional rotational transform information by calculating movement information from an initial orientation of the mobile device to a present orientation based on the mobile device orientation information;
    removing noise of the tracing information of the mobile device; and
    generating tracing information of the mobile device based on the position information and the generated 3-dimensional rotational transform information.

21. The contents display method according to claim 17, wherein said generating of a predetermined virtually augmented contents image further includes:
    generating transform information of 3-dimensional virtually augmented image by spatially transforming the predetermined contents based on the tracing information of the mobile device and the gesture information;
    controlling properties of the contents to be rendered and rendering characteristics; and
    generating and transmitting the virtually augmented contents image based on the 3-dimensional virtually augmented image transform information, the properties of the contents and the rendering characteristics.

22. The contents display method according to claim 17, wherein the predetermined contents is an e-book contents having a plurality of pages.

23. The contents display method according to claim 22, wherein said generating of gesture information further includes generating first gesture information to change a size of the e-book virtually augmented contents image according to a first predetermined ratio based on a distance between the head-mounted display apparatus and the mobile device.

24. The contents display method according to claim 22, wherein said generating of gesture information further includes receiving predetermined second input information with respect to the mobile device and generating second gesture information where a first page of the e-book virtually augmented contents image is shifted to a second page of the e-book virtually augmented contents image.

25. The contents display method according to claim 22, wherein said generating of gesture information further includes storing a third page of the e-book virtually augmented contents image by receiving predetermined third input information with respect to the mobile device, and, after the page is stored, generating third gesture information to display the stored third page by receiving predetermined fourth input information.

26. The contents display method according to claim 22, wherein said generating of gesture information further includes shifting to an e-book flipping-through mode by receiving predetermined fourth input information with respect to the mobile device, and generating fourth gesture information to continuously turn over a plurality pages of the e-book virtually augmented contents image by receiving predetermined fifth input information.

27. The contents display method according to claim 17, further comprising controlling a feedback unit of the mobile device to generate feedback control information, which generates sound or vibration feedback, based on the gesture information, and transmit the feedback control information to the mobile device.

28. The contents display method according to claim 17, further comprising controlling by generating feedback control information which controls the head-mounted display device to generate a sound feedback, based on the gesture information.

* * * * *